Figure 5:
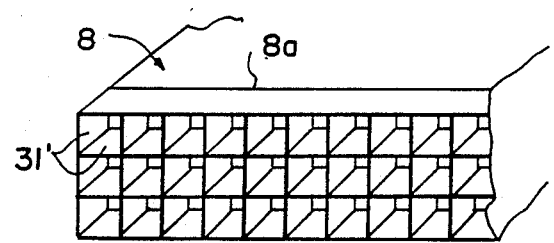

United States Patent [19]

Saotome

[11] Patent Number: 4,950,904
[45] Date of Patent: Aug. 21, 1990

[54] RADIATION IMAGE READ-OUT APPARATUS

[75] Inventor: Shigeru Saotome, Kanagawa, Japan

[73] Assignee: Fuji Photo Film Co., Ltd., Kanagawa, Japan

[21] Appl. No.: 470,501

[22] Filed: Jan. 26, 1990

[30] Foreign Application Priority Data

Jan. 31, 1989 [JP] Japan .................. 64-22336

[51] Int. Cl.$^5$ .................... G21K 4/00; G01D 15/14
[52] U.S. Cl. .................... 250/327.2; 250/484.1; 250/505.1
[58] Field of Search .................... 250/327.2 F, 363.10, 250/484.1, 505.1

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 382/6 |
| 4,346,295 | 8/1982 | Tanaka et al. | 250/327.2 |
| 4,387,428 | 6/1983 | Ishida et al. | 364/413.13 |
| 4,582,988 | 4/1986 | Aagano | 250/327.2 |
| 4,661,708 | 4/1982 | Agano | 250/327.2 |
| 4,680,473 | 7/1987 | Matsuda et al. | 250/484.1 |
| 4,742,225 | 5/1988 | Chan | 250/327.2 |
| 4,816,688 | 3/1989 | Saotome | 250/484.1 |
| 4,818,880 | 4/1989 | Matsuda et al. | 250/327.2 |
| 4,835,387 | 5/1989 | Saotome | 364/900 |
| 4,849,632 | 7/1989 | Watanabe | 250/327.2 |

FOREIGN PATENT DOCUMENTS

| | | |
|---|---|---|
| 56-11395 | 2/1981 | Japan . |
| 61-07489 | 1/1986 | Japan .................. 250/363.1 |
| 61-63155 | 4/1986 | Japan . |
| 61-120573 | 6/1986 | Japan . |

Primary Examiner—Constantine Hannaher
Assistant Examiner—J. Eisenberg
Attorney, Agent, or Firm—Sughrue, Mion, Zinn, MacPeak & Seas

[57] ABSTRACT

A radiation image read-out apparatus comprises a main scanning system which scans a stimulable phosphor sheet, on which a radiation image has been stored, with stimulating rays in a main scanning direction. The stimulating rays cause the stimulable phosphor sheet to emit light in proportion to the amount of energy stored thereon during its exposure to radiation. A sub-scanning system moves the stimulable phosphor sheet with respect to the stimulating rays in a direction approximately normal to the main scanning direction. A light guide member, which has a light input face extending along the main scanning line on the stimulable phosphor sheet, guides the emitted light entering the light guide member at its light input face to a light output face. A photodetector is connected to the light output face. Plate-shaped members are secured to the light input face at predetermined intervals, the intervals being taken in the main scanning direction, so that the plate-shaped members are erect in a direction approximately normal to the light input face and surfaces of adjacent plate-shaped members face each other.

27 Claims, 4 Drawing Sheets

F I G. 1
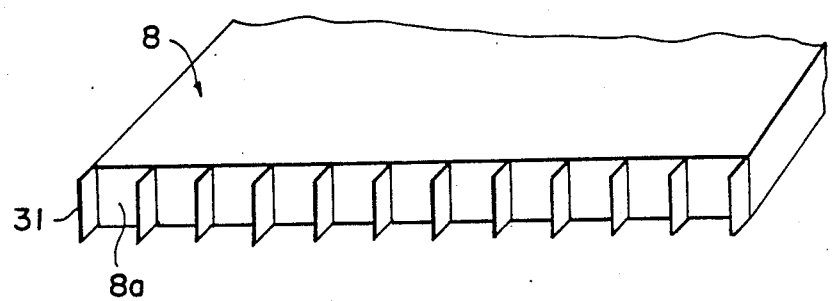
F I G. 2
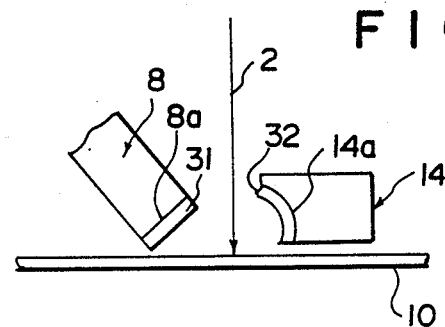
F I G. 3
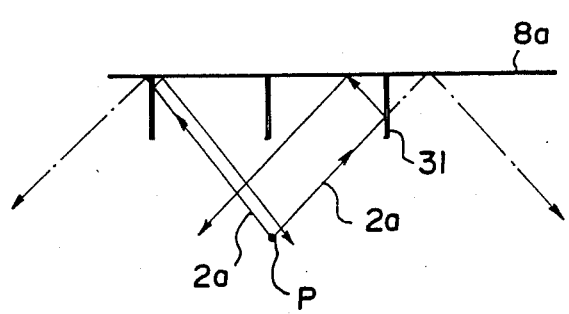
F I G. 4
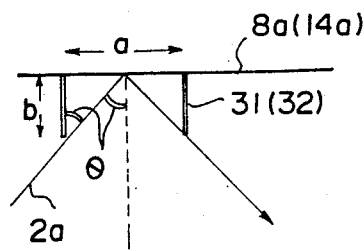

RADIATION IMAGE READ-OUT APPARATUS

BACKGROUND OF THE INVENTION

1. Field of the Invention

This invention relates to an apparatus for reading out a radiation image which has been stored on a stimulable phosphor sheet. This invention particularly relates to a radiation image read-out apparatus with which light emitted by a stimulable phosphor sheet in proportion to the amount of energy stored thereon during its exposure to radiation can be detected accurately.

2. Description of the Prior Art

When certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Pat. Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light, which is emitted by the stimulable phosphor sheet when it is stimulated, is photoelectrically detected and converted into an electric image signal. The image signal is then used to reproduce the radiation image of the object as a visible image on a recording material such as photographic film, on a display device such as a cathode ray tube (CRT), or the like.

Figure 9:
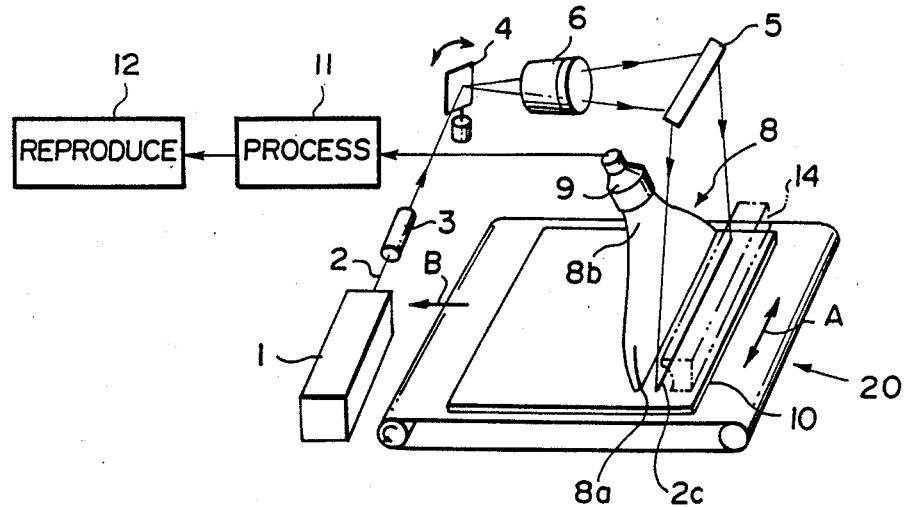

FIG. 9 is a perspective view showing a conventional radiation image read-out apparatus. It has been proposed to use radiation image read-out apparatuses like that shown in FIG. 9 in the radiation image recording and reproducing systems described above. With such a radiation image read-out apparatus, a stimulable phosphor sheet, on which a radiation image has been stored, can be scanned with stimulating rays, such as a laser beam, which cause the stimulable phosphor sheet to emit light in proportion to the amount of energy stored thereon during its exposure to radiation, and the emitted light can be photoelectrically emitted.

In the radiation image read-out apparatus of FIG. 9, stimulating rays 2 are produced by a stimulating ray source 1, and the beam diameter of the stimulating rays 2 is precisely adjusted by a beam expander 3. Thereafter, stimulating rays 2 are deflected by a light deflector 4, which may be constituted of a galvanometer mirror or the like. The deflected stimulating rays 2 are reflected by a plane reflection mirror 5, after which they impinge upon a stimulable phosphor sheet 10 and scan it in the main scanning directions indicated by the double headed arrow A. An fθ lens 6 is located in the optical path of the deflected stimulating rays 2 between the light deflector 4 and the plane reflection mirror 5. The fθ lens 6 keeps the beam diameter of the stimulating rays 2 uniform, and stimulating rays 2 having a uniform beam diameter scan the stimulable phosphor sheet 10 at a constant speed in the main scanning directions. In the illustrated radiation image read-out apparatus, the stimulating ray source 1, the beam expander 3, the light deflector 4, the plane reflection mirror 5, and the fθ lens 6 constitute a main scanning means. While the stimulating rays 2 impinge upon the stimulable phosphor sheet 10, the stimulable phosphor sheet 10 is moved by a sub-scanning means, which may be constituted of an endless belt device 20, in the sub-scanning direction indicated by the arrow B, which direction is approximately normal to the main scanning directions. Consequently, the whole surface of the stimulable phosphor sheet 10 is exposed to the stimulating rays 2. When it is being exposed to the stimulating rays 2, the stimulable phosphor sheet 10 emits light in proportion to the amount of energy stored thereon during its exposure to radiation. The emitted light enters a light guide member 8. The light guide member 8 has a linear light input face 8a which is positioned along a main scanning line 2c on the stimulable phosphor sheet 10. A ring-shaped light output face 8b of the light guide member 8 is connected to a light receiving face of a photodetector 9, which may be constituted of a photomultiplier. The light guide member 8 is made from a transparent thermoplastic resin sheet, such as an acrylic resin sheet, so that light which has entered the light guide member 8 at its light input face 8a is guided through repeated total reflection inside of the light guide member 8 to the light output face 8b. The light, which has been emitted by the stimulable phosphor sheet 10 and which has entered the light guide member 8, is guided inside of the light guide member 8, emanates from the light output face 8b, and is detected by the photodetector 9. Shapes and materials which are suitable for the light guide member 8 are disclosed in, for example, U.S. Pat. No. 4,346,295.

A filter (not shown) is positioned so that it is in close contact with the light receiving face of the photodetector 9. The filter transmits only light whose wavelengths fall within the wavelength distribution range of the light emitted by the stimulable phosphor sheet 10, and filters out light whose wavelengths fall within the wavelength distribution range of the stimulating rays 2. Therefore, only light which is emitted by the stimulable phosphor sheet 10 will be detected by the photodetector 9. The photodetector 9 converts the light emitted by the stimulable phosphor sheet 10 into an electric signal and feeds it into an image processing circuit 11 which processes the electric signal. The processed electric signal is fed into an image reproducing apparatus, which may be constituted of a CRT, a light beam scanning recording apparatus, or the like, and is used to reproduce a visible image. Alternatively, the processed electric signal may be stored on a magnetic tape or the like.

Also, in the radiation image read-out apparatus described above, in order to improve the efficiency with which the light emitted by the stimulable phosphor sheet 10, when it is scanned with the stimulating rays 2, is guided, a reflection mirror 14 is often located facing the light input face 8a of the light guide member 8 with the main scanning line 2c intervening therebetween. The reflection mirror 14 reflects the light which is emitted from the position which is being scanned on the stimulable phosphor sheet 10. The light advances from the side opposite to the light guide member 8 towards the light input face 8a of the light guide member 8.

Figure 10:
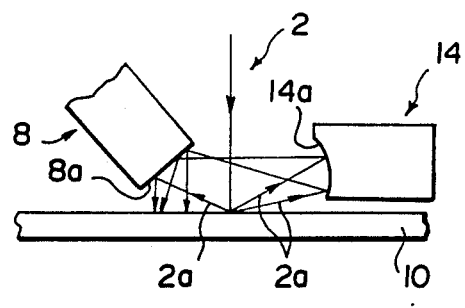

FIG. 10 is a schematic side view showing a major part of the radiation image read-out apparatus shown in FIG. 9. As illustrated in FIG. 10, in the conventional radiation image read-out apparatus described above, a part 2a of the stimulating rays 2 impinging upon a position on the stimulable phosphor sheet 10, which position is being scanned at any given instant, is reflected by surface of the stimulable phosphor sheet 10. These reflected stimulating rays 2a are then reflected by the light input face 8a of the light guide member 8 and impinge upon a position on the stimulable phosphor sheet 10 which is not being scanned at the given instant, which causes said position on the stimulable phosphor sheet which is not being scanned to emit light. (This phenomenon is referred to as the flare phenomenon.) When the flare phenomenon occurs, light emitted from the position on the stimulable phosphor sheet 10, which position is not being scanned at the given instant, enters the light guide member 8 and is detected by the photodetector 9 together with the light which is emitted from the position on the stimulable phosphor sheet 10, which position is being scanned at the given instant. Therefore, the radiation image stored on the stimulable phosphor sheet 10 cannot be read out accurately, and the contrast in a visible radiation image which is reproduced from the image signal thus detected will be low.

Also, in cases where the reflection mirror 14 is located as illustrated in FIG. 10, parts 2a, 2a of the stimulating rays 2, which have been reflected from the position on the stimulable phosphor sheet 10, which position is being scanned at the given instant, toward a reflection surface 14a of the reflection mirror 14, are reflected by the reflection surface 14a towards the light input face 8a of the light guide member 8. The reflected stimulating rays 2a, 2a are even further reflected by the light input face 8a, and impinge upon positions on the stimulable phosphor sheet 10, which positions are not being scanned at the given instant. Therefore, when the reflection mirror 14 is provided, an even larger adverse effect occurs from the flare phenomenon, even though the efficiency, with which the light emitted by the stimulable phosphor sheet 10 is guided, is improved.

In order to reduce the adverse effects of the flare phenomenon, the applicant has proposed various radiation image read-out apparatuses.

For example, in U.S. Pat. No. 4,818,880, a radiation image read-out apparatus is disclosed wherein an antireflection film is overlaid on a light input face of the light guide member in order to prevent stimulating rays from being reflected by the light input face. Stimulating rays reflected from a stimulable phosphor sheet are allowed to enter the light guide member and are filtered out by a filter, which is positioned between a light output face of the light guide member and a light receiving face of a photodetector. Also, U.S. Pat. No. 4,680,473 discloses a radiation image read-out apparatus wherein the reflection surface of a reflection mirror is treated, which makes the reflection mirror substantially reflect light emitted by a stimulable phosphor sheet and absorb or transmit stimulating rays reflected from the stimulable phosphor sheet. However, these disclosed radiation image read-out apparatuses have a problem in that stimulating rays, which have been reflected from a stimulable phosphor sheet and impinge at a comparatively large angle of incidence the light input face of the light guide member or upon the reflection surface of the reflection mirror, cannot be substantially prevented from being reflected by the light input face of the light guide member or the reflection surface of the reflection mirror. Stimulating rays, which have been reflected from a stimulable phosphor sheet and impinge at a comparatively large angle of incidence upon the light input face of the light guide member or upon the reflection surface of the reflection mirror, are reflected by the light input face of the light guide member or the reflection surface of the reflection mirror to positions on the stimulable phosphor sheet, which are located far apart from the position which is being scanned at any given instant. Therefore, serious problems occur with regard to the quality of the image which is reproduced from an image signal detected from the stimulable phosphor sheet.

Other novel techniques have been proposed to reduce the adverse effects of the flare phenomenon caused by a reflection mirror. With these techniques reducing the adverse effects of the flare phenomenon caused by the reflection mirror is considered to be more important than improving the efficiency with which the light emitted by a stimulable phosphor sheet is guided by the reflection mirror. For example, U.S. Pat. No. 4,816,688 discloses a technique wherein a reflection mirror is moved, when necessary, to a position that does not reflect stimulating rays which have been reflected from a stimulable phosphor sheet. U.S. Pat. No. 4,835,387 discloses a technique wherein a means which absorbs stimulating rays is inserted between the position, which is being scanned with stimulating rays, and a reflection mirror. Also, Japanese Unexamined Pat. Publication No. 61(1986)-120573 discloses a technique wherein a liquid crystal shutter is located between the position, which is being scanned with stimulating rays, and a reflection mirror, and the liquid crystal shutter is placed in a light absorbing mode. However, with these techniques, though the adverse effects of the flare phenomenon caused by a reflection mirror are reduced, the efficiency with which the light emitted by a stimulable phosphor sheet is guided by the reflection mirror decreases inevitably.

Additionally, in U.S. Pat. Nos. 4,680,473 and 4,818,880, radiation image read-out apparatuses have been disclosed wherein a filter which absorbs reflected stimulating rays and transmits light emitted by a stimulable phosphor sheet is positioned between the position, which is being scanned with stimulating rays, and a light input face of a light guide member, and/or between the position, which is being scanned with stimulating rays, and a reflection surface of a reflection mirror. The disclosed radiation image read-out apparatuses have a drawback in that stimulating rays, which have been reflected from the stimulable phosphor sheet and impinge at a comparatively large angle of incidence upon the filter, cannot be substantially absorbed by the filter.

Moreover, in Japanese Unexamined Pat. Publication No. 61(1986)-63155, a radiation image read-out apparatus is proposed wherein a high directivity grid is provided on a light input face of a light guide member. The grid is provided with a plurality of light absorbing plates which prevent light, which is emitted from positions outside of the main scanning line, from impinging upon the light input face. However, the light absorbing plates of the grid extend uniformly with respect to the main scanning direction. Therefore, no substantial effect is obtained with regard to the elimination of the flare phenomenon caused by stimulating rays which are reflected to various positions distributed along the main scanning line. Of the total adverse effect from the flare phenomenon, that which occurs from reflections to the light input face of the light guide member from positions distributed along the main scanning line has the largest impact on the image quality of an image reproduced from an image signal detected from the stimulable phosphor sheet. Accordingly, with this proposed radiation image read-out apparatus, the adverse effects of the flare phenomenon cannot be eliminated substantially.

SUMMARY OF THE INVENTION

The primary object of the present invention is to provide a radiation image read-out apparatus wherein stimulating rays, which have impinged upon a position on a stimulable phosphor sheet being scanned at any given instant and which have been reflected therefrom, are prevented by a novel means from impinging upon and stimulating different positions on the stimulable phosphor sheet, which positions are not being scanned at the given instant and are spaced far apart from the position which is being scanned at the given instant, whereby the flare phenomenon is reduced.

Another object of the present invention is to provide a radiation image read-out apparatus wherein when a novel means for preventing the flare phenomenon is combined with a conventional means for preventing the flare phenomenon, the ability of the conventional means to prevent the flare phenomenon is enhanced.

The specific object of the present invention is to provide a radiation image read-out apparatus wherein the flare phenomenon is substantially prevented from occurring along the main scanning direction.

The present invention provides a first radiation image read-out apparatus comprising:

i) a main scanning means which scans a stimulable phosphor sheet, on which a radiation image has been stored, with stimulating rays in a main scanning direction, the stimulating rays causing the stimulable phosphor sheet to emit light in proportion to the amount of energy stored thereon during its exposure to radiation, ii) a sub-scanning means which moves the stimulable phosphor sheet with respect to the stimulating rays in a sub-scanning direction approximately normal to the main scanning direction, iii) a light guide member which has a light input face extending along a main scanning line on the stimulable phosphor sheet and which guides the light emitted by the stimulable phosphor sheet and entering the light guide member at its light input face to a light output face of the light guide member, and iv) a photodetector which is connected to the light output face of the light guide member, wherein the improvement comprises the provision of a plurality of plate-shaped members which are secured to said light input face of said light guide member at predetermined intervals, said intervals being taken in said main scanning direction, so that said plate-shaped members are erect in a direction approximately normal to said light input face, and surfaces of adjacent plate-shaped members are located facing each other.

The present invention also provides a second radiation image read-out apparatus comprising:

i) a main scanning means which scans a stimulable phosphor sheet, on which a radiation image has been stored, with stimulating rays in a main scanning direction, the stimulating rays causing the stimulable phosphor sheet to emit light in proportion to the amount of energy stored thereon during its exposure to radiation, ii) a sub-scanning means which moves the stimulable phosphor sheet with respect to the stimulating rays in a sub-scanning direction approximately normal to the main scanning direction, iii) a light guide member which has a light input face extending along a main scanning line on the stimulable phosphor sheet and which guides the light emitted by the stimulable phosphor sheet and entering the light guide member at its light input face to a light output face of the light guide member, iv) a photodetector which is connected to the light output face of the light guide member, and v) a reflection mirror which is positioned facing said light input face of said light guide member with said main scanning line intervening between said reflection mirror and said light input face, said reflection mirror reflecting said light, which has been emitted by said stimulable phosphor sheet, towards said light input face, wherein the improvement comprises the provision of:

a) a plurality of plate-shaped members which are secured to said light input face of said light guide member at predetermined intervals, said intervals being taken in said main scanning direction, so that said plate-shaped members secured to said light input face are erect in a direction approximately normal to said light input face, and surfaces of adjacent plate-shaped members are located facing each other, and/or b) a plurality of plate-shaped members which are secured to a reflection surface of said reflection mirror at predetermined intervals, said intervals being taken in said main scanning direction, so that said plate-shaped members secured to said reflection surface are erect in a direction approximately normal to said reflection surface, and surfaces of adjacent plate-shaped members are located facing each other.

In the first and second radiation image read-out apparatuses in accordance with the present invention, the plate-shaped members are located at predetermined intervals, the intervals being taken in the main scanning direction, so that stimulating rays which have been reflected from a scanned position on the stimulable phosphor sheet to various positions distributed along the present main scanning line impinge efficiently upon the plate-shaped members. In cases where the plate-shaped members are located in such a manner, it is possible substantially to eliminate the flare phenomenon occurring along the main scanning line, which has the largest adverse effect on the image quality of an image reproduced from an image signal detected from the stimulable phosphor sheet, of any adverse effect resulting when the flare phenomenon occurs at other places on the stimulable phosphor sheet. In cases where the flare phenomenon should be more thoroughly prevented from occurring, plate-shaped members may also be located at predetermined intervals, the intervals being taken in the sub-scanning direction. Alternatively, each of the plate-shaped members located at the predetermined intervals, the intervals being taken in the main scanning direction, may be constituted of a combination of plates which extends in various directions with respect to the main scanning direction and the sub-scanning direction.

As will be understood from the specification, it should be noted that the term "moving a stimulable phosphor sheet with respect to stimulating rays in a sub-scanning direction" as used herein means movement of the stimulable phosphor sheet relative to the stimulating rays in the sub-scanning direction, and embraces both the cases wherein the stimulable phosphor sheet is moved while the stimulating rays are kept stationary with respect to the sub-scanning direction, and cases wherein the stimulating rays are moved in the sub-scanning direction while the stimulable phosphor sheet is kept stationary.

With the first radiation image read-out apparatus in accordance with the present invention, a plurality of plate-shaped members are secured to the light input face of the light guide member. Therefore, stimulating rays, which have been reflected from a stimulable phosphor sheet and follow paths impinging at a comparatively large angle of incidence upon the light input face of the light guide member, impinge upon the plate-shaped members. The stimulating rays which impinge upon the plate-shaped members are absorbed by the plate-shaped members, or are reflected by the plate-shaped members and caused to impinge upon the light input face of the light guide member. Some of the stimulating rays, which are thus caused to impinge upon the light input face of the light guide member, are reflected by the light input face and impinge upon the stimulable phosphor sheet. At this time, the stimulating rays thus reflected by the light input face of the light guide member impinge upon positions on the stimulable phosphor sheet, which positions are located comparatively close to the position which is being scanned at any given instant. In this manner, the plate-shaped members prevent the stimulating rays from impinging upon and stimulating positions on the stimulable phosphor sheet, which are not being scanned at any given instant and are spaced for apart from the position which is being scanned at the given instant. Therefore, the image quality of an image, which is reproduced from an image signal detected from the stimulable phosphor sheet, will not be adversely affected by the flare phenomenon. Stimulating rays, which have been reflected from a stimulable phosphor sheet and follow paths which do not impinge upon he plate-shaped members, impinge at a comparatively small angle of incidence upon the light input face of the light guide member. Therefore, the stimulating rays are not reflected to positions on the stimulable phosphor sheet, which are not being scanned at any given instant and are spaced far apart from the position on the stimulable phosphor sheet which is being scanned at the given instant.

Also, with the second radiation image read-out apparatus in accordance with the present invention, a plurality of plate-shaped members are secured to the light input face of the light guide member, and/or a plurality of plate-shaped members are secured to the reflection surface of the reflection mirror. As described above, in cases where the plate-shaped members are secured to the light input face of the light guide member, stimulating rays, which have been reflected from a stimulable phosphor sheet and follow paths impinging at a comparatively large angle of incidence upon the light input face of the light guide member, impinge upon the plate-shaped members secured to the light input face. In cases where the plate-shaped members are secured to the reflection surface of the reflection mirror, stimulating rays, which have been reflected from a stimulable phosphor sheet and follow paths impinging at a comparatively large angle of incidence upon the reflection surface of the reflection mirror, impinge upon the plate-shaped members secured to the reflection surface. The stimulating rays which impinge upon the plate-shaped members secured to the light input face and/or upon the plate-shaped members secured to the reflection surface are absorbed by he corresponding plate-shaped members, or are reflected by the corresponding plate-shaped members and caused to impinge upon the light input face of the light guide member. As described above, some of the stimulating rays, which are thus caused to impinge upon the light input face of the light guide member, are reflected by the light input face and impinge upon the stimulable phosphor sheet. At this time, the stimulating rays thus reflected by the light input face of the light guide member impinge upon positions on the stimulable phosphor sheet, which are located comparatively close to the position which is being scanned at any given instant. In this manner, the plate-shaped members secured to the light input face of the light guide member and/or the plate-shaped members secured to the reflection surface of the reflection mirror prevent the stimulating rays from impinging upon and stimulating positions on the stimulable phosphor sheet, which are not being scanned at any given instant and are spaced far apart from the position which is being scanned at the given instant. Therefore, the image quality of an image, which is reproduced from an image signal detected from the stimulable phosphor sheet, will not be adversely affected by the flare phenomenon. Stimulating rays, which have been reflected from a stimulable phosphor sheet and follow paths which do not impinge upon the plate-shaped members secured to the light input face of the light guide member or the plate-shaped members Also, in cases where the plate-shaped members 32, 32, ... are secured to the reflection surface 14a of the reflection mirror 14 shown in FIG. 2, stimulating rays, which have been reflected from the position P on the stimulable phosphor sheet and which follow paths impinging upon the reflection mirror 14, are reflected by the reflection mirror 14 provided with the plate-shaped members 32, 32, ... The stimulating rays thus reflected by the reflection mirror 14 follow paths, which come together in the vicinity of the position which is being scanned and are not dispersed largely along the main scanning direction. These stimulating rays are then caused to impinge upon the light input face 8a of the light guide member 8. The stimulating rays, which have thus impinged upon the light input face 8a, are reflected by the light input face 8a and impinge upon positions on the stimulable phosphor sheet which are comparatively close to the position being scanned.

In cases where the plate-shaped members 31, 31, are secured to the light input face 8a and/or the plate-shaped members 32, 32, ... are secured to the reflection surface 14a, part of the light emitted from the position on the stimulable phosphor sheet which is being scanned also impinges upon the plate-shaped members 31, 31, ... and/or the plate-shaped members 32, 32, ... Therefore, the efficiency, with which the light is guided which is emitted from the position being scanned on the stimulable phosphor sheet, decreases slightly. When it is particularly desirable for the efficiency, with which the light is guided, which light is emitted from the position being scanned on the stimulable phosphor sheet, to be prevented from decreasing, the plate-shaped members 31, 31, ... and/or the plate-shaped members 32, 32, ... may be provided with surfaces which exhibit a high reflectivity (a reflectivity of, for example, not lower than 30%). When it is more important to eliminate the flare phenomenon than to improve the efficiency with which the light is guided, the plate-shaped members 31, 31, ... and/or the plate-shaped members 32, 32, ... may be provided with surfaces which exhibit a high absorbance (an absorbance of, for example, not lower than 30%). When it is desired that the flare phenomenon be reduced efficiently without the efficiency, with which the light is guided, which light is emitted from the position being scanned on the stimulable phosphor sheet, being decreased substantially, the plate-shaped members 31, 31, ... and/or the plate-shaped members 32, 32, ... may be modified so that they absorb only light whose wavelengths fall within the wavelength distribution range of the stimulating rays (with an absorbance of, for example, not lower than 30%), and reflect only light whose wavelengths fall within the wavelength distribution range of the light emitted by the stimulable phosphor sheet (with a reflectivity of, for example, not lower than 30%). Alternatively, the plate-shaped members 31, 31, ... and/or the plate-shaped members 32, 32, ... may be modified so that they absorb only light whose wavelengths fall within the wavelength distribution range of the stimulating rays (with an absorbance of, for example, not lower than 30%), and transmit only light whose wavelengths fall within the wavelength distribution range of the light emitted by the stimulable phosphor sheet (with a transmittance of, for example, not lower than 30%). As another alternative, the plate-shaped members 31, 31, ... and/or the plate-shaped members 32, 32, ... may be modified so that they reflect only light having wavelengths within the wavelength distribution range of the stimulating rays (with a reflectivity of, for example, not lower than 30%), and transmit only light having wavelengths within the wavelength distribution range of the light emitted by the stimulable phosphor sheet (with a transmittance of, for example, not lower than 30%).

As disclosed in U.S. Pat. No. 4,818,880, in order for the light input face 8a of the light guide member 8 substantially to transmit both the light emitted by the stimulable phosphor sheet and the stimulating rays, an antireflection film constituted of a material, which exhibits a refractive index lower than the refractive index of the material constituting the light guide member 8, should preferably be overlaid on the light input face 8a with a vacuum evaporation process or the like. Also, as disclosed in U.S. Pat. No. 4,680,473, the reflection surface 14a of the reflection mirror 14 should preferably be treated so that the reflection surface 14a substantially transmits or absorbs only light having wavelengths within the wavelength distribution range of the stimulating rays, and substantially reflects only light having wavelengths within the wavelength distribution range of the light emitted by the stimulable phosphor sheet.

With reference to FIG. 4, the interval "a" and the height "b" of the plate-shaped members 31, 31, ... and/or the plate-shaped members 32, 32, ... may be selected in accordance with the reflection characteristics, the absorption characteristics, and the transmission characteristics of the plate-shaped members 31, 31, ... and/or the plate-shaped members 32, 32, ..., the desired level of efficiency, with which the light is to be guided, which light is emitted from the position being scanned on the stimulable phosphor sheet, the desired extent to which the flare phenomenon should be prevented from occurring, or the like. For example, in cases where the plate-shaped members 31, 31, ... secured to the light input face 8a substantially absorb only light having wavelengths within the wavelength distribution range of the stimulating rays, the interval "a" and the height "b" of the plate-shaped members 31, 31, ... and/or the plate-shaped members 32, 32, ... should preferably be set so that the angle of incidence $\theta$ of the stimulating rays, which are reflected from the position being scanned on the stimulable phosphor sheet, upon the light input face 8a is not larger than 60°. The interval "a" and the height "b" should more preferably be set so that the angle of incidence $\theta$ of the stimulating rays is not larger than 30°. The angle of incidence $\theta$ of the stimulating rays is calculated from the formula $$\tan^{-1}\left(\frac{\left(\frac{a}{2}\right)}{b}\right).$$

Figure 7:
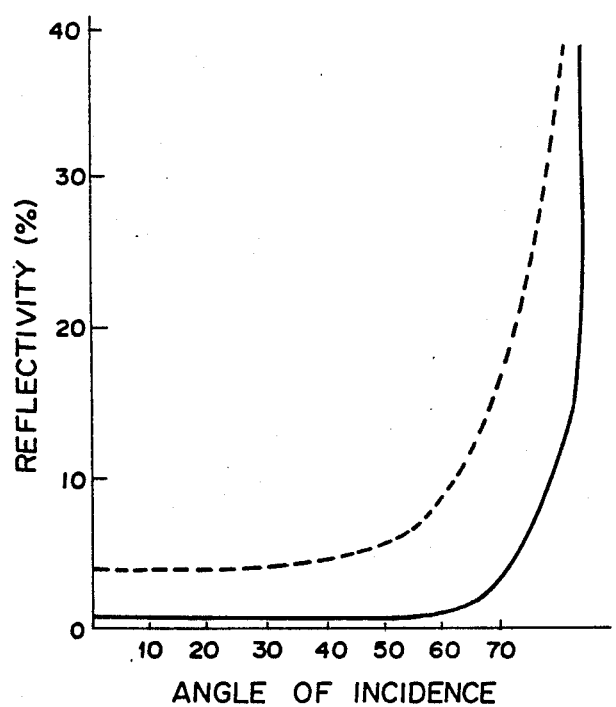

Specifically, the curve indicated by the broken line in FIG. 7 represents the relationship between the angle of incidence of stimulating rays (having a wavelength of 633nm) upon a glass plate, which serves as a material in the light guide member, and the reflectivity of the stimulating rays from the glass plate. The curve indicated by the solid line in FIG. 7 represents the relationship between the angle of incidence of the stimulating rays upon a glass plate, on which an antireflection film has been overlaid, and the reflectivity of the stimulating rays from said glass plate. As is clear from FIG. 7, with both the glass plate and the glass plate provided with the antireflection film, when the angle of incidence of the stimulating rays is smaller than 60°, the reflectivity does not increase very much as the angle of incidence increases. When the angle of incidence of the stimulating rays is smaller than 30°, the reflectivity is substantially kept at its lowest level. In cases where, as described above, the plate-shaped members 31, 31, ... secured to the light input face 8a substantially absorb only light having wavelengths within the wavelength distribution range of the stimulating rays, it is considered that the maximum angle of incidence of the stimulating rays, which are reflected from the position being scanned on the stimulable phosphor sheet, upon the light input face 8a will be equal to $$\tan^{-1}\left(\frac{\left(\frac{a}{2}\right)}{b}\right).$$

In cases where the angle of incidence expressed as $$\tan^{-1}\left(\frac{\left(\frac{a}{2}\right)}{b}\right)$$

is smaller than 60°, and preferably smaller than 30°, even when the stimulating rays, which have been reflected from the position being scanned on the stimulable phosphor sheet, impinge upon the light input face 8a without impinging upon the plate-shaped members 31, 31, ..., very few of the stimulating rays will be reflected from the light input face 8a. Therefore, the flare phenomenon can be very efficiently prevented from occurring.

Figure 8:
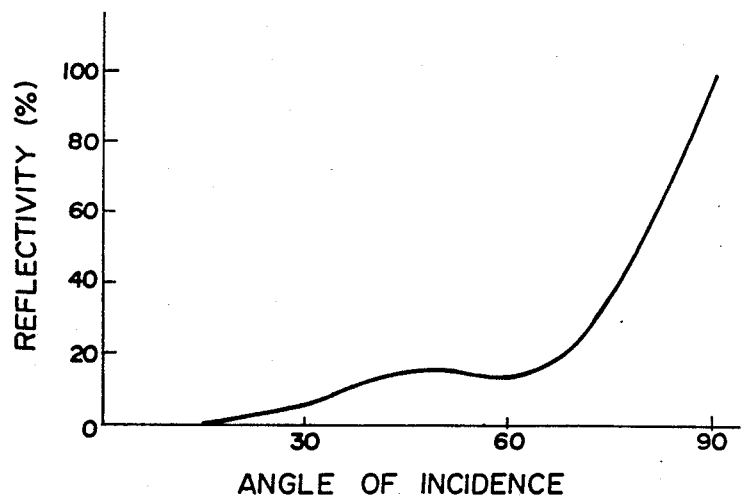

FIG. 8 shows the relationship between the angle of incidence of stimulating rays (having a wavelength of 633nm) upon a reflection surface, on which a dichroic coating film has been overlaid, and the reflectivity of the stimulating rays from the reflection surface. The dichroic coating film transmits only light having wavelengths within the wavelength distribution range of the stimulating rays, and reflects only light having wavelengths within the wavelength distribution range of the light emitted by the stimulable phosphor sheet. As is clear from FIG. 8, in cases where the dichroic coating film is overlaid on the reflection surface 14a, and the plate-shaped members 32, 32, ... absorb only light having wavelengths within the wavelength distribution range of the stimulating rays, the interval "a" and the height "b" of the plate-shaped members 32, 32, ... secured to the reflection surface 14a should preferably be set so that the angle of incidence expressed as $$\tan^{-1}\left(\frac{\left(\frac{a}{2}\right)}{b}\right)$$

will be smaller than 60°, and preferably smaller than 30°.

It is only necessary that the plate-shaped members 31, 31, ... secured to the light input face 8a and/or the plate-shaped members 32, 32, ... secured to the reflection surface 14a be located at predetermined intervals, the intervals being taken in at least the main scanning direction, and the surfaces of adjacent plate-shaped members face each other, for the flare phenomenon with respect to the main scanning direction to be efficiently prevented from occurring. In the embodiment described above, each of the plate-shaped members 31, 31, ... extends along a direction which is normal to the longitudinally direction of the light input face 8a. However, the direction along which each of the plate-shaped members 31, 31, ... extends is not limited to a direction which is normal to the longitudinal direction of the light input face 8a, but may be oblique to the longitudinal direction of the light input face 8a. Also, in the embodiment described above, each of the plate-shaped members 32, 32, ... extends along a direction which is normal to the longitudinal direction of the reflection surface 14a. However, the direction along which each of the plate-shaped members 32, 32, ... extends is not limited to a direction which is normal to the longitudinal direction of the reflection surface 14a, but may be oblique to the longitudinal direction of the reflection surface 14a.

Figure 6:
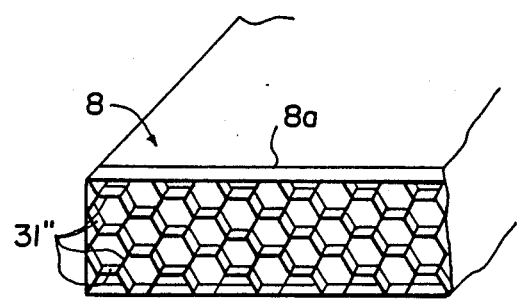

FIGS. 5 and 6 are perspective views showing plate-shaped members in further embodiments of the radiation image read-out apparatus in accordance with the present invention. As shown in FIG. 5, plate-shaped members 31', 31', ... may be secured to the light input face 8a of the light guide member 8 so that they are located at predetermined intervals which are taken in the main scanning direction, and at predetermined intervals which are taken in the sub-scanning direction. With this embodiment, the flare phenomenon with respect to the sub-scanning direction can also be efficiently prevented from occurring. Alternatively, as shown in FIG. 6, plate-shaped shaped members 31", 31", ..., which comprises plates extending in various directions, may be secured to the light input face 8a of the light guide member 8. The configurations shown in FIGS. 5 and 6 may also be applied to the plate-shaped members which are secured to the reflection surface 14a of the reflection mirror 14.

In radiation image read-out apparatuses provided with reflection mirrors, the plate-shaped members may be secured to either the light guide member or the reflection mirror. Also, the radiation image read-out apparatus in accordance with the present invention is not limited to apparatuses provided with reflection mirrors.

Also, the radiation image read-out apparatus in accordance with the present invention is not limited to an apparatus provided with a comparatively large-sized light guide member 8 and small-sized photodetector 9, which is connected to the light output face of the light guide member 8. For example, as proposed in U.S. Pat. Application Ser. No. 141,259, a long photomultiplier may be positioned such that its light receiving face extends along a main scanning line on a stimulable phosphor sheet, and a comparatively small-sized light guide member may be connected to the light receiving face of the long photomultiplier.

I claim:
1. A radiation image read-out apparatus comprising:
   i) a main scanning means which scans a stimulable phosphor sheet, on which a radiation image has been stored, with stimulating rays in a main scanning direction, the stimulating rays causing the stimulable phosphor sheet to emit light in proportion to the amount of energy stored thereon during its exposure to radiation,
   ii) a sub-scanning means which moves the stimulable phosphor sheet with respect to the stimulating rays in a sub-scanning direction approximately normal to the main scanning direction,
   iii) a light guide member which has a light input face extending along a main scanning line on the stimulable phosphor sheet and which guides the light emitted by the stimulable phosphor sheet and entering the light guide member at its light input face to a light output face of the light guide member, and
   iv) a photodetector which is connected to the light output face of the light guide member,
   wherein the improvement comprises the provision of a plurality of plate-shaped members which are secured to said light input face of said light guide member at predetermined intervals, said intervals being taken in said main scanning direction, so that said plate-shaped members are erect in a direction approximately normal to said light input face, and surfaces of adjacent plate-shaped members are located facing each other.

2. An apparatus as defined in claim 1 wherein said plate-shaped members extend in a direction normal to said main scanning direction.

3. An apparatus as defined in claim 1 wherein a plurality of plate-shaped members are also secured to said light input face of said light guide member and located at predetermined intervals, said intervals being taken in the sub-scanning direction, so that said plate-shaped members are erect in a direction approximately normal to said light input face, and surfaces of adjacent plate-shaped members are located facing each other.

4. An apparatus as defined in claim 1 wherein each of said plate-shaped members is constituted of a combination of plates which extend in various directions with respect to said main scanning direction and to said sub-scanning direction.

5. An apparatus as defined in claim 1 wherein said plate-shaped members are provided with surfaces which exhibit a high reflectivity.

6. An apparatus as defined in claim 1 wherein said plate-shaped members are provided with surfaces which exhibit a high absorbance.

7. An apparatus as defined in claim 1 wherein said plate-shaped members absorb only light having wavelengths within the wavelength distribution range of said stimulating rays, and reflect only light having wavelengths within the wavelength distribution range of said light emitted by said stimulable phosphor sheet.

8. An apparatus as defined in claim 1 wherein said plate shaped members absorb only light having wavelengths within the wavelength distribution range of said stimulating rays, and transmit only light having wavelengths within the wavelength distribution range of said light emitted by said stimulable phosphor sheet.

9. An apparatus as defined in claim 1 wherein said plate-shaped members reflect only light having wavelengths within the wavelength distribution range of said stimulating rays, and transmit only light having wavelengths within the wavelength distribution range of said light emitted by said stimulable phosphor sheet.

10. An apparatus as defined in claim 1 wherein an antireflection film constituted of a material, which exhibits a refractive index lower than the refractive index of the material constituting said light guide member, is overlaid on said light input face.

11. An apparatus as defined in claim 1 wherein said plate-shaped members substantially absorb only light having wavelengths within the wavelength distribution range of said stimulating rays, and said predetermined intervals and the height of said plate-shaped members are set so that the angle of incidence of the stimulating rays, which are reflected from a position being scanned on said stimulable phosphor sheet, upon said light input face is not larger than 60°, said angle of incidence of the stimulating rays being calculated from the formula $$\tan^{-1}\left(\frac{\left(\frac{a}{2}\right)}{b}\right)$$

where a represents said predetermined intervals, and b represents the height of said plate-shaped members.

12. An apparatus as defined in claim 11 wherein said predetermined intervals and the height of said plate-shaped members are set so that the angle of incidence of the stimulating rays, which are reflected from a position being scanned on said stimulable phosphor sheet, upon said light input face is not larger than 30°.

13. A radiation image read-out apparatus comprising:
i) a main scanning means which scans a stimulable phosphor sheet, on which a radiation image has been stored, with stimulating rays in a main scanning direction, the stimulating rays causing the stimulable phosphor sheet to emit light in proportion to the amount of energy stored thereon during its exposure to radiation,
ii) a sub-scanning means which moves the stimulable phosphor sheet with respect to the stimulating rays in a sub-scanning direction approximately normal to the main scanning direction,
iii) a light guide member which has a light input face extending along a main scanning line on the stimulable phosphor sheet and which guides the light emitted by the stimulable phosphor sheet and entering the light guide member at its light input face to a light output face of the light guide member,
iv) a photodetector which is connected to the light output face of the light guide member, and
v) a reflection mirror which is positioned facing said light input face of said light guide member with said main scanning line intervening between said reflection mirror and said light input face, said reflection mirror reflecting said light, which has been emitted by said stimulable phosphor sheet, towards said light input face,
wherein the improvement comprises the provision of:
a) a plurality of plate-shaped members which are secured to said light input face of said light guide member at predetermined intervals, said intervals being taken in said main scanning direction, so that said plate-shaped members secured to said light input face are erect in a direction approximately normal to said light input face, and surfaces of adjacent plate-shaped members are located facing each other, and/or
b) a plurality of plate-shaped members which are secured to a reflection surface of said reflection mirror at predetermined intervals, said intervals being taken in said main scanning direction, so that said plate-shaped members secured to said reflection surface are erect in a direction approximately normal to said reflection surface, and surfaces of adjacent plate-shaped members are located facing each other.

14. An apparatus as defined in claim 13 wherein said plate-shaped members secured to said light input face and/or said plate-shaped members secured to said reflection surface extend in a direction normal to said main scanning direction.

15. An apparatus as defined in claim 13 wherein a plurality of plate-shaped members are also secured to said light input face of said light guide member and located at predetermined intervals, said intervals being taken in the sub-scanning direction, so that said plate-shaped members are erect in a direction approximately normal to said light input face, and surfaces of adjacent plate-shaped members are located facing each other, and/or
a plurality of plate-shaped members are also secured to said reflection surface of said reflection mirror and located at predetermined intervals, said intervals being taken in the sub-scanning direction, so that said plate-shaped members are erect in a direction approximately normal to said reflection surface, and surfaces of adjacent plate-shaped members are located facing each other.

16. An apparatus as defined in claim 13 wherein each of said plate-shaped members secured to said light input face and/or each of said plate-shaped members secured to said reflection surface is constituted of a combination of plates which extend in various directions with respect to said main scanning direction and to said sub-scanning direction.

17. An apparatus as defined in claim 13 wherein said plate-shaped members secured to said light input face and/or said plate-shaped members secured to said reflection surface are provided with surfaces which exhibit a high reflectivity.

18. An apparatus as defined in claim 13 wherein said plate-shaped members secured to said light input face and/or said plate-shaped members secured to said reflection surface are provided with surfaces which exhibit a high absorbance.

19. An apparatus as defined in claim 13 wherein said plate-shaped members secured to said light input face and/or said plate-shaped members secured to said reflection surface absorb only light having wavelengths within the wavelength distribution range of said stimulating rays, and reflect only light having wavelengths within the wavelength distribution range of said light emitted by said stimulable phosphor sheet.

20. An apparatus as defined in claim 13 wherein said plate-shaped members secured to said light input face and/or said plate-shaped members secured to said reflection surface absorb only light having wavelengths within the wavelength distribution range of said stimulating rays, and transmit only light having wavelengths within the wavelength distribution range of said light emitted by said stimulable phosphor sheet.

21. An apparatus as defined in claim 13 wherein said plate-shaped members secured to said light input face and/or said plate-shaped members secured to said reflection surface reflect only light having wavelengths within the wavelength distribution range of said stimulating rays, and transmit only light having wavelengths within the wavelength distribution range of said light emitted by said stimulable phosphor sheet.

22. An apparatus as defined in claim 13 wherein an antireflection film constituted of a material, which exhibits a refractive index lower than the refractive index of the material constituting said light guide member, is overlaid on said light input face.

23. An apparatus as defined in claim 13 wherein said reflection surface of said reflection mirror is treated so that said reflection surface substantially transmits or absorbs only light having wavelengths within the wavelength distribution range of said stimulating rays, and substantially reflects only light having wavelengths within the wavelength distribution range of said light emitted by said stimulable phosphor sheet.

24. An apparatus as defined in claim 13 wherein said plate-shaped members secured to said light input face substantially absorb only light having wavelengths within the wavelength distribution range of said stimulating rays, and
    said predetermined intervals and the height of said plate-shaped members secured to said light input face are set so that the angle of incidence of the stimulating rays, which are reflected from a position being scanned on said stimulable phosphor sheet, upon said light input face is not larger than 60°, said angle of incidence of the stimulating rays being calculated from the formula $$\tan^{-1}\left(\frac{\left(\frac{a}{2}\right)}{b}\right)$$

where a represents said predetermined intervals of said plate-shaped members secured to said light input face, and b represents the height of said plate-shaped members secured to said light input face.

25. An apparatus as defined in claim 24 wherein said predetermined intervals and the height of said plate-shaped members secured to said light input face are set so that the angle of incidence of the stimulating rays, which are reflected from a position being scanned on said stimulable phosphor sheet, upon said light input face is not larger than 30°.

26. An apparatus as defined in claim 13 wherein a dichroic coating film, which transmits only light having wavelengths within the wavelength distribution range of said stimulating rays and reflects only light having wavelengths within the wavelength distribution rang of said light emitted by said stimulable phosphor sheet, is overlaid on said reflection surface,
    said plate-shaped members secured to said reflection surface absorb only light having wavelengths within the wavelength distribution range of said stimulating rays, and
    said predetermined intervals and the height of said plate-shaped members secured to said reflection surface are set so that the angle of incidence of the stimulating rays, which are reflected from a position being scanned on said stimulable phosphor sheet, upon said reflection surface is not larger than 60°, said angle of incidence of the stimulating rays being calculated from the formula $$\tan^{-1}\left(\frac{\left(\frac{a}{2}\right)}{b}\right)$$

where a represents said predetermined intervals of said plate-shaped members secured to said reflection surface, and b represents the height of said plate-shaped members secured to said reflection surface.

27. An apparatus as defined in claim 26 wherein said predetermined intervals and the height of said plate-shaped members secured to said reflection surface are set so that the angle of incidence of the stimulating rays, which are reflected from a position being scanned on said stimulable phosphor sheet, upon said reflection surface is not larger than 30°.

* * * * *